United States Patent [19]

Menon et al.

[11] Patent Number: 5,301,297
[45] Date of Patent: Apr. 5, 1994

[54] METHOD AND MEANS FOR MANAGING RAID 5 DASD ARRAYS HAVING RAID DASD ARRAYS AS LOGICAL DEVICES THEREOF

[75] Inventors: Jaishankar M. Menon, San Jose; Leighton C. Wood, Jr., Morgan Hill, both of Calif.

[73] Assignee: IBM Corp. (International Business Machines Corp.), Armonk, N.Y.

[21] Appl. No.: 725,696

[22] Filed: Jul. 3, 1991

[51] Int. Cl.$^5$ .............................................. G06F 12/06
[52] U.S. Cl. ................................ 395/425; 395/575;
371/10.1; 364/DIG. 1; 364/943.9; 364/944.61;
364/944.92; 364/945.6; 364/957; 364/957.1;
364/964; 364/966; 364/970
[58] Field of Search ................... 395/425, 575; 371/7,
371/10.1, 10.2, 11.1, 40.1, 50.1

[56] References Cited

U.S. PATENT DOCUMENTS

| | | | |
|---|---|---|---|
| 4,092,732 | 5/1978 | Ouchi | 364/900 |
| 4,914,465 | 4/1990 | Dunphy et al. | 371/10.2 |
| 5,263,145 | 11/1993 | Brady et al. | 395/425 |
| 5,271,012 | 12/1993 | Blaum | 371/10.1 |

OTHER PUBLICATIONS

"A Case for Redundant Arrays of Inexpensive Disks (RAID)", Patterson, et al. Report #UCB/CSD 87/391, Dec., 1987, Computer Science Division Univ. of California, Berkeley.

Co-Pending Blaum, et al., "Method and Means for Coding and Rebuilding the Data Contents of Unavailable DASDs or Rebuilding the Contents of One DASD in Error in the Presence of a Reduced Number of Unavailable DADSs in a DASD Array" filed Jun 21, 1991 (IBM Ref. SA9-91-038).

"Providing Fault Tollerance In Parallel Secondary Storage Systems", Dept. Computer Science, Princeton Univ., Report CA-TR-057-86, Nov. 7, 1986, Park, et al.

*Primary Examiner*—Paul V. Kulik
*Attorney, Agent, or Firm*—Bruce Brodie

[57] ABSTRACT

A method and apparatus teaching insertion of addressing indirection to form and to access an array hierarchy expressly permitting the concurrency of a high level RAID array, the bandwidth and degraded mode operation sustainable by a lower level RAID array, and after a DASD failure minimum spanning involvement when the array is rebuilding and rewriting missing data to a spare logical device. Also, disclosed are the accessing of variable length records on the array hierarchy; array hierarchy in which RAID 5 arrays have dissimilar number of logic devices (lower level RAID arrays) and interleave depths; formation of logical arrays using fractional storage defined onto real DASD subsets; and the defining of logical devices onto DASDs distributed in the same or different physical clusters of DASDs and the rebuild operation thereof.

13 Claims, 9 Drawing Sheets

A RAID 5 Array of RAID 3 DASD Arrays

FIG. 1: A RAID 3 DASD Array
(PRIOR ART)

FIG. 2: A RAID 5 DASD Array With Column Track Layout
(PRIOR ART)

FIG. 3: A RAID 5 DASD Array With Row Track Layout
(PRIOR ART)

FIG. 4: A RAID 5 Array of RAID 3 DASD Arrays

FIG. 5: An Array Subsystem With Multiple Dissimilar RAID 5 of RAID 3 DASD Arrays FIG. 6: An Array Subsystem With Multiple Fractional RAID 5 of RAID 3 DASD Arrays

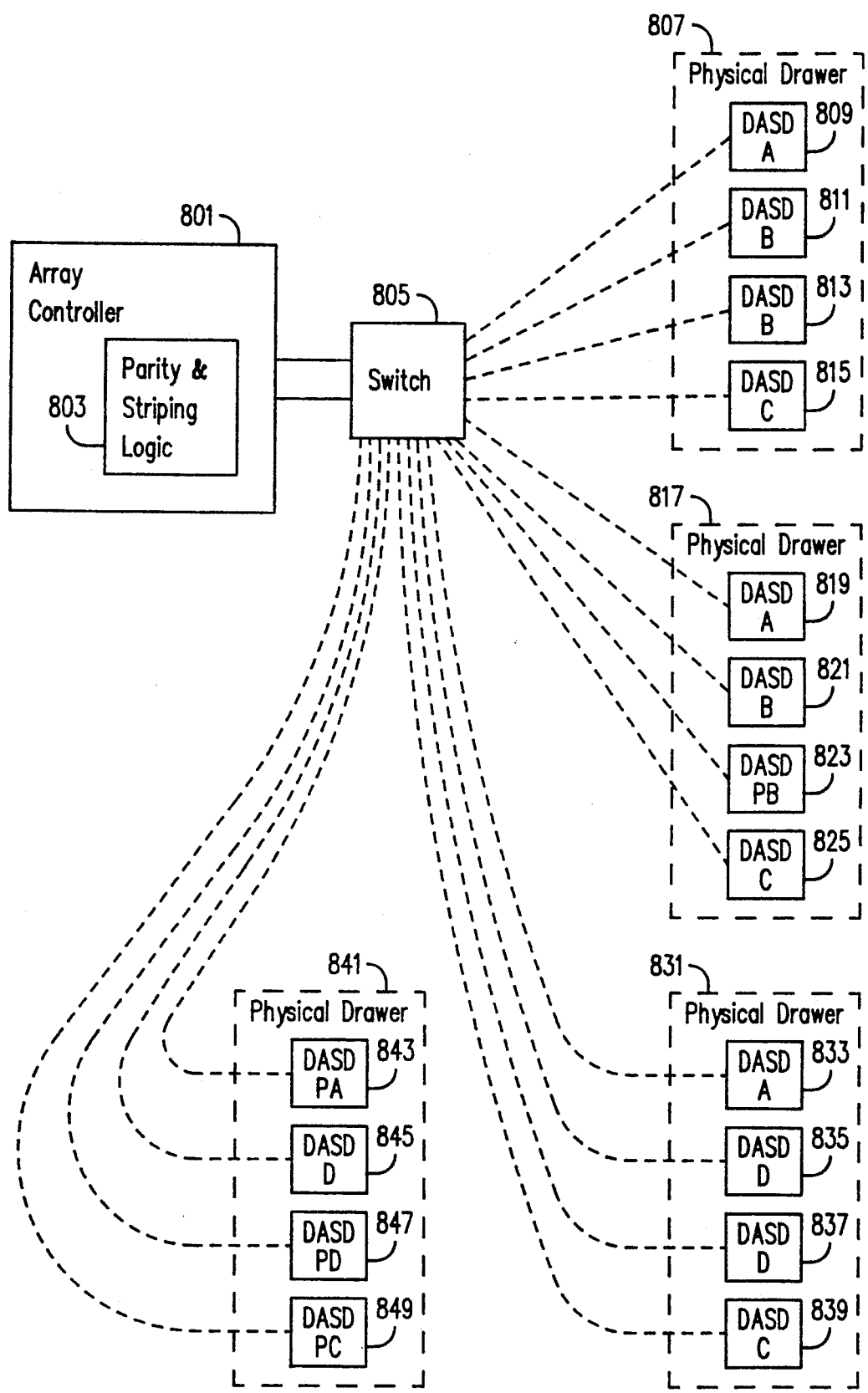
FIG. 8: Array Hierarchy – Physical Devices Distributed.

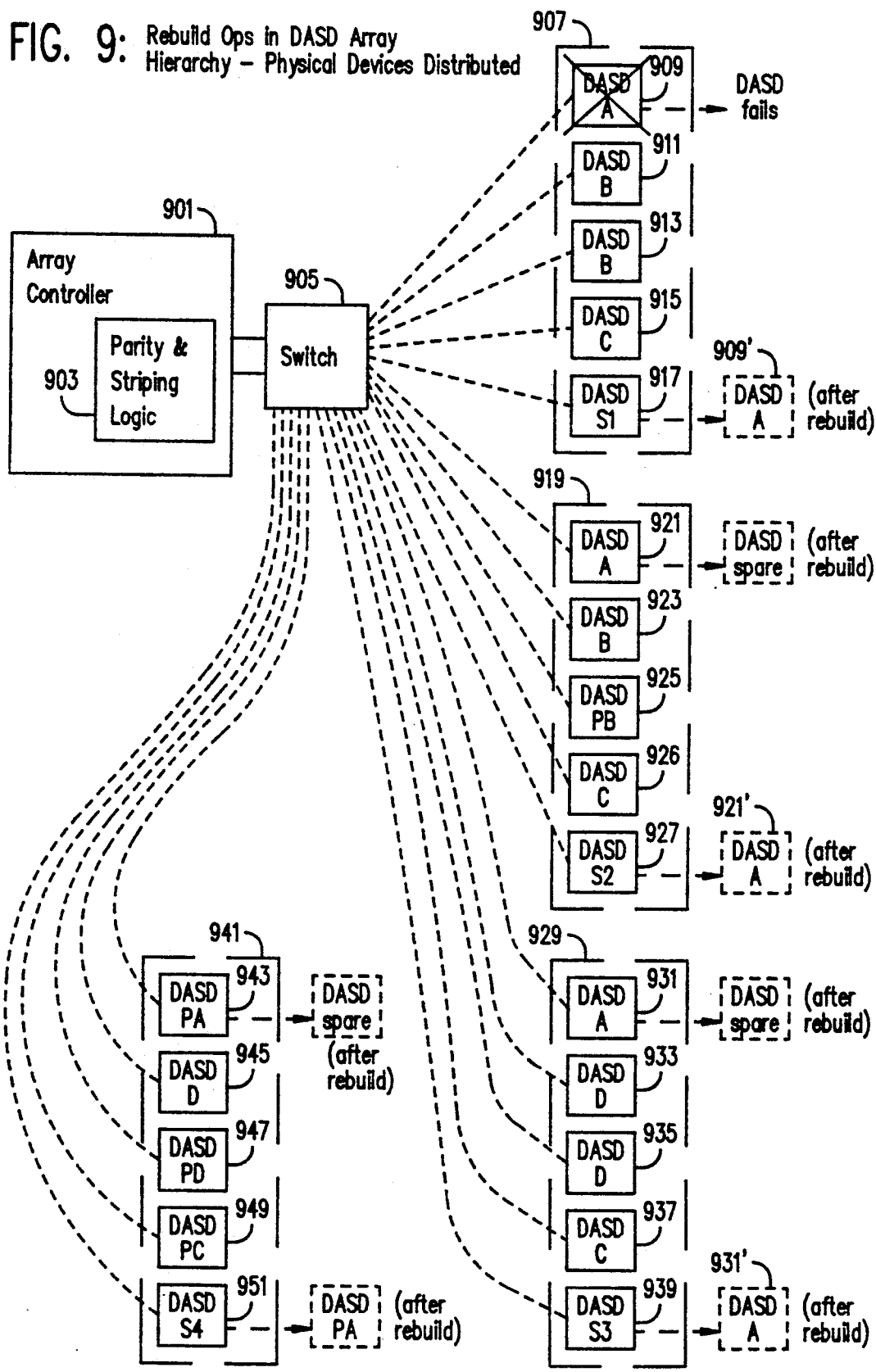

1

METHOD AND MEANS FOR MANAGING RAID 5 DASD ARRAYS HAVING RAID DASD ARRAYS AS LOGICAL DEVICES THEREOF

FIELD OF THE INVENTION

This invention relates to DASD array storage subsystems, and more particularly, to methods and means for efficiently processing large and small DASD array reads and writes in normal (fault tolerant), degraded, and rebuild modes.

DESCRIPTION OF RELATED ART

RAID 3 Array and Redundancy

RAID 3 designates a DASD array wherein data+-parity are synchronously spread across N data+P parity DASDs. That is, the data is segmented and written (striped) across an array of at least N+P DASDs in column major order. This accords with the typology provided by Patterson et al, "A Case For Redundant Arrays Of Inexpensive Disks (RAID)", Report No. UCB/CSD 87/391, December 1987, Computer Science Division, U. of California, Berkeley.

The parity coding and striping of data across multiple DASDs and the rebuilding of data after a single DASD failure was introduced by Ouchi et al U.S. Pat. No. 4,092,732, "System for Recovering Data Stored in a Failed Memory Unit", issued May 30, 1978. Also, replacement of a failed DASD by a formatted reserved spare "hot sparing" was described for a single parity domain by Arvin Park et al, "Providing Fault Tolerance In Parallel Secondary Storage Systems", Dept. Computer Science, Princeton University, Report CS-TR-057-86, Nov. 7, 1986. Likewise, dynamically configuring multiple parity domains and sharing of formatted spares across multiple domains was taught by Dunphy et al, U.S. Pat. No. 4,914,656, "Disk Drive Memory", issued Apr. 19, 1990.

Because RAID 3 arrays read and write parity coded segmented data to N+P DASDs synchronously, the data rate increases by N*single DASD rate. Also, the logical track size increases by N*single DASD track length. The P parity DASDs permits the array to continue operation even where one or more DASDs have failed (degraded mode). The failure limit is based on the properties of the parity coding and the on-fly-processing thereof, the amount of spare storage capacity, the time available to reconstitute missing data on the spare, the likelihood of multiple concurrent failures etc. Many arrays are premised on at most two non-nested DASD failures.

Increasing the number of DASDs decreases the mean time between array failure. However, the use of redundancy such as parity coding and sparing increases the mean time between data unavailability because the system re-creates the missing data by recalculating it from the remaining data and/or rewriting it to a replacement DASD.

RAID 3 Degraded Mode and Data Rebuild for a Single DASD Failure

In degraded mode where P=1, if the parity DASD is the one that is unavailable, the data is nonetheless accessible, N blocks at a time, from the N data DASDs. If one of the data DASD is the one that has failed, then it is necessary to rebuild the missing block from each referenced stripe or ordered segment set by logically combining the remaining blocks from the same stripe or set. Since this operation must be performed for each access, throughput is not reduced because recovery of a single parity or data block can be performed within the array controller on the fly. The risk of total array data unavailability should another failure occur while operating in this mode is not acceptable. The alternatives to permit array access where two or more failures occur are to parity encode data with P>=2 or rebuild the data on a spare or replacement DASD.

Where a formatted spare DASD is substituted for a failed DASD and data rebuilt and rewritten on said spare (rebuild mode), throughput returns to its normal rate. The array is said to change from a degraded to a normal (fault tolerant) mode. It should be noted that the rebuild and rewriting of the missing data onto a spare DASD may be done on a scheduled or opportunistic basis.

Where up to two DASDs fail at the same time, the rebuild of the data requires use of more powerful coding methods and means such as the block parity coding disclosed and claimed in the copending Blaum, U.S. Ser. No. 07/653,596, "Method and Means for Encoding and Rebuilding Data Contents of Up to Two Unavailable DASDs in an Array of DASDs", filed Feb. 11, 1991, now U.S. Pat. No. 5,271,012, or Blaum and Roth, U.S. Ser. No. 07/718,724, "Method and Means for Coding and Rebuilding the Data Contents of Unavailable DASDs or Rebuilding the Contents of One DASD in Error in the Presence of a Reduced Number of Unavailable DASDs in a DASD Array", filed 06/21/1991.

RAID 5 Array Defined Differently for This Invention

RAID 5 arrays distribute data and parity over a synchronize set of N DASDs. Patterson defines RAID 5 as merely recording parity on more than two DASDs in a synchronous DASD set.

For purposes of this invention, RAID 5 DASD array is defined to be any DASD array accessible by a common control unit where concurrence of access and data rate are a trade-off function of the depth of interleaving. Interleave depth is in turn defined as the number of consecutive blocks of a logical track that are stored on a DASD before continuing with the next DASD in the array.

Alternatively, a RAID 5 array is any N data +P parity DASD array in which a selectable interleave depth controls the striping and where P>=0.

An ample illustration is fully described in copending application to Brady et al, U.S. Ser. No. 07/528,999, "Method and Means for Accessing DASD Arrays With Tuned Data Transfer Rate and Concurrency", filed May 24, 1990, now U.S. Pat. No. 5,263,145.

For maximum concurrence, each DASD in an array of N would be accessed at the same time by a logically independent process. The data rate/process would be limited to that of a single DASD. This assumes that the data being referenced was written onto a counterpart DASD in row major order. On the other hand, for maximum data rate, all N DASDs would be accessed by one process. Relatedly, each logical record would be written in column major order.

For completeness, column major order (sometimes called column track layout) has an interleave depth of 1. In contrast, row major order (sometimes called row track layout) exhibits an interleave depth equal to the number of blocks K in a DASD physical track.

Large and Small Reads and Writes

A CPU request to a storage subsystem (DASD array), which requires transferring large amounts of sequential data, is termed a "large request" or a "large transfer". A request for a small amount of data will be referred to as a "small request" or a "small transfer". RAID 3 arrays are most efficient for large requests associated with numerically intensive computing and the like. In contrast, RAID 5 arrays can support small requests found with transaction processing via concurrency as where the interleave depth $> =2$. Also, RAID 5 permits spreading data, parity, and spare capacity to balance workload/DASD, maintain high availability and DASD utilization with increased processing overhead.

Read requests involve positioning the access arms over the DASDs and copying data from the array usually to a buffer and sometimes checking the parity. Write requests and especially write update requests involve several operations. These include reading the old data+parity, calculating the new parity from the old data+new data+old parity, and writing back the new data+new parity. This involves at least two read and two write accesses per each write update.

SUMMARY OF THE INVENTION

It is an object of this invention to devise a method and means for processing large and small reads and writes with respect to a storage subsystem.

It is another object to devise a method and means providing the concurrency of a high level RAID array and the data rate of a low level RAID array.

It is still another object that said method and means provide minimum spanning when the array is operated in degraded and rebuild modes.

It is a related object of this invention to devise a method and means wherein arrays of dissimilar interleave depth may be accessed through a common path while preserving the concurrency and data rate and degraded and rebuild mode capabilities.

The above objects are satisfied by an embodiment utilizing the insertion of at least one layer of addressing indirection to access subsets of a plurality of DASDs as a RAID 5 array of RAID 3 DASD arrays. The embodiment is operable in either a fault tolerant, degraded, or rebuild modes.

In fault tolerant (normal mode), the method and means comprise configuring the subsystem into a RAID 5 array of logical devices, the RAID 5 array including at least one spare logical device, each logical device in turn comprises a RAID 3 DASD array; writing parity coded and segmented logical records in column major order of predetermined interleave depth onto the RAID 5 logical devices; and accessing each logical record as N+P segmented blocks onto N+P DASDs of the counterpart RAID 3 array.

Alternatively, the configuration step includes the formation of logical RAID 3 arrays formed from no more than one DASD selected from each of N+P addressable failure independent DASD strings.

Where access is to be made of a logical device containing a failed DASD (degraded mode), the method includes concurrently accessing N+P-1 blocks from counterpart N+P-1 DASD. Advantageously, the rebuilding and rewriting of a spare logical device necessary to return to normal mode spans only the spare and the logical device containing the failed DASD.

BRIEF DESCRIPTION OF THE DRAWING

FIG. 8 lays out that physical DASD resident in the same physical drawer are configurable into different logical devices coupling a common control unit.

FIG. 9 depicts the reconfiguration of the physical DASDs after a DASD failure and as a result of rebuilding the data resident on the failed DASD and writing the same to a spare DASD.

DESCRIPTION OF THE PREFERRED EMBODIMENT

RAID 5 Row and Column Layout

Figure 1:
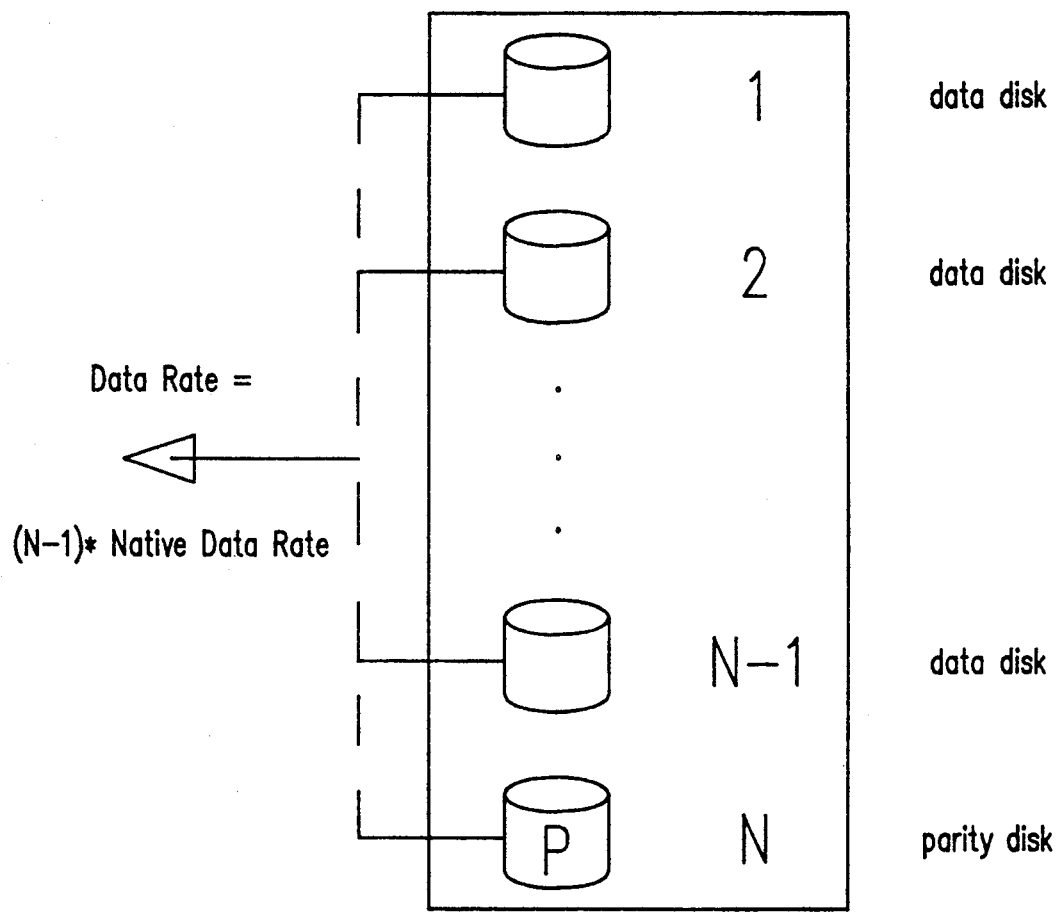
FIG. 1 shows a RAID 3 DASD array according to the prior art tuned to handle large read and write requests.

Referring now to FIG. 1, there is depicted a synchronous array of N DASDs according to the prior art. In this array, the blocks of a record are written in column major order with the Nth DASD always containing the parity block in the manner of the copending Brady et al application. Advantageously, the data rate is increased N-1 times the transfer rate of a single DASD and has found use where large read/writes were involved. Restated, if a logical record were written N+P blocks at a time to a synchronous array of N+P DASDs, the data rate would be N*the single DASD rate.

As previously mentioned, failures (MTBF) of the DASD array also termed logical DASD in FIG. 1 is much higher than that of each individual physical DASD. As pointed out, a RAID 3 array can continue to operate, in degraded mode, even after the failure of one of the individual DASDs that make up the array. This is because data on the failed DASD can be recreated from the data and parity on the remaining N-1 DASDs that have not failed.

The array ordinarily operates in normal mode. When a DASD in the array has failed, the array operates in degraded mode. When the failed DASD is replaced with a spare, the array operates in rebuild mode until data has been completely rebuilt to the spare.

Rebuilding typically proceeds in parallel with other user activity against the array, so the performance of the array in rebuild mode is worse than in normal or degraded modes. Note, that the performance of the RAID 3 array in degraded mode is no worse than in normal mode.

Figure 2:
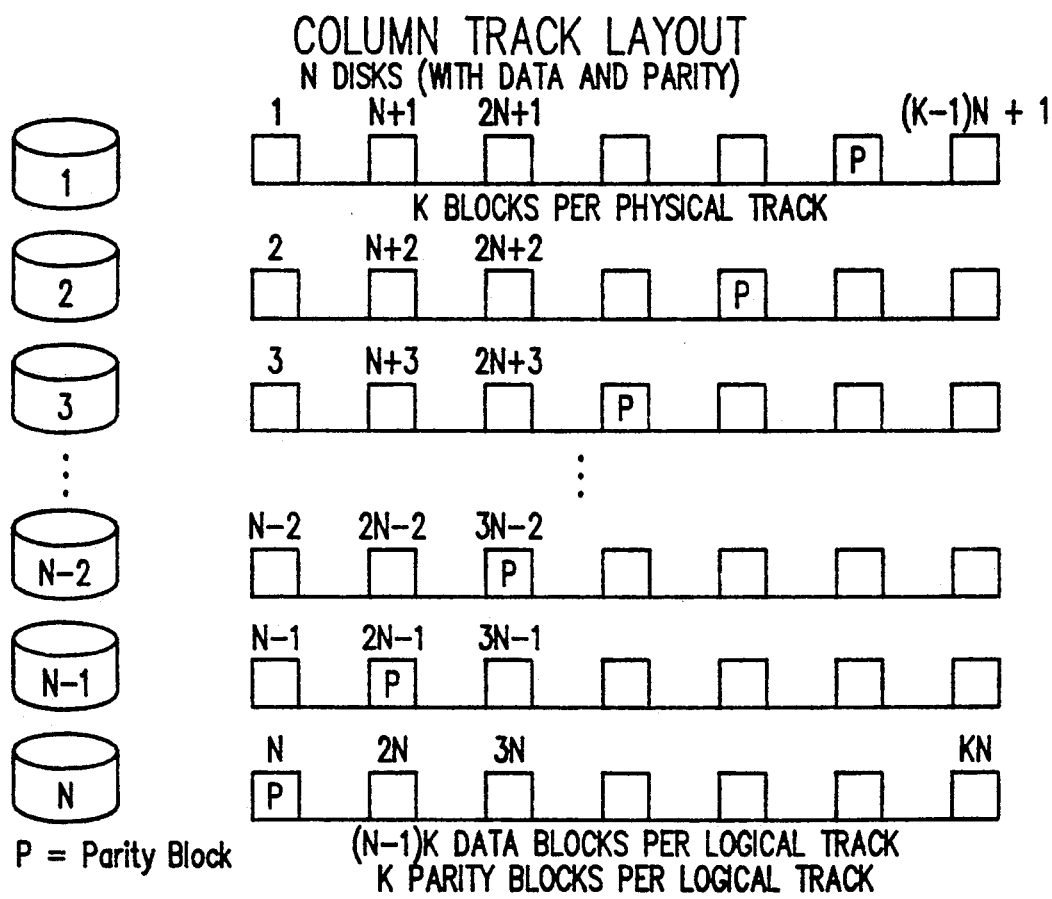
FIGS. 2 and 3 depict a higher level RAID array also according to the prior art with logical blocks written in column major order and row major order respectively.

Referring now to FIG. 2, there is shown a RAID 5 DASD array using block interleaving with one Kbyte blocks. For a RAID 5 array with N DASD and K blocks per physical track, the logical track has NK blocks of which (N-1)K blocks are data blocks and the remaining K blocks are parity blocks. In FIG. 2, one logical track is shown. A predetermined number of logical tracks make up a logical cylinder. The invention to be subsequently described takes advantge of the principle involved in the ability to address a logical device (sometimes called a logical DASD) of multiple blocks, tracks and cylinders and map the addresses into real DASD array storage and vis a' vis.

Referring again to FIG. 2, consider how the data in a logical track is stored. The first Kbyte of data is stored entirely in the first block of DASD 1 (Block 1), the second Kbyte of data is stored entirely in the first block of DASD 2 (Block 2), and so on. The pattern of recording is variously termed column track layout or column major ordering of a logical array, since consecutive sequential blocks of the logical track are stored in columns. Note that the parity blocks are spread over the DASDs such that no one DASD contains the parity blocks.

Now, accessing 1 Kbyte of data only requires access to one of the DASDs, and the other DASDs are free to handle other small transfers. As a result, a high degree of parallelism is possible for small transfers. At the same time, high data rate can be achieved on large transfers, since the data to be read or written on a large transfer is spread across the N DASDs, all of which may be read or written in parallel.

Figure 3:
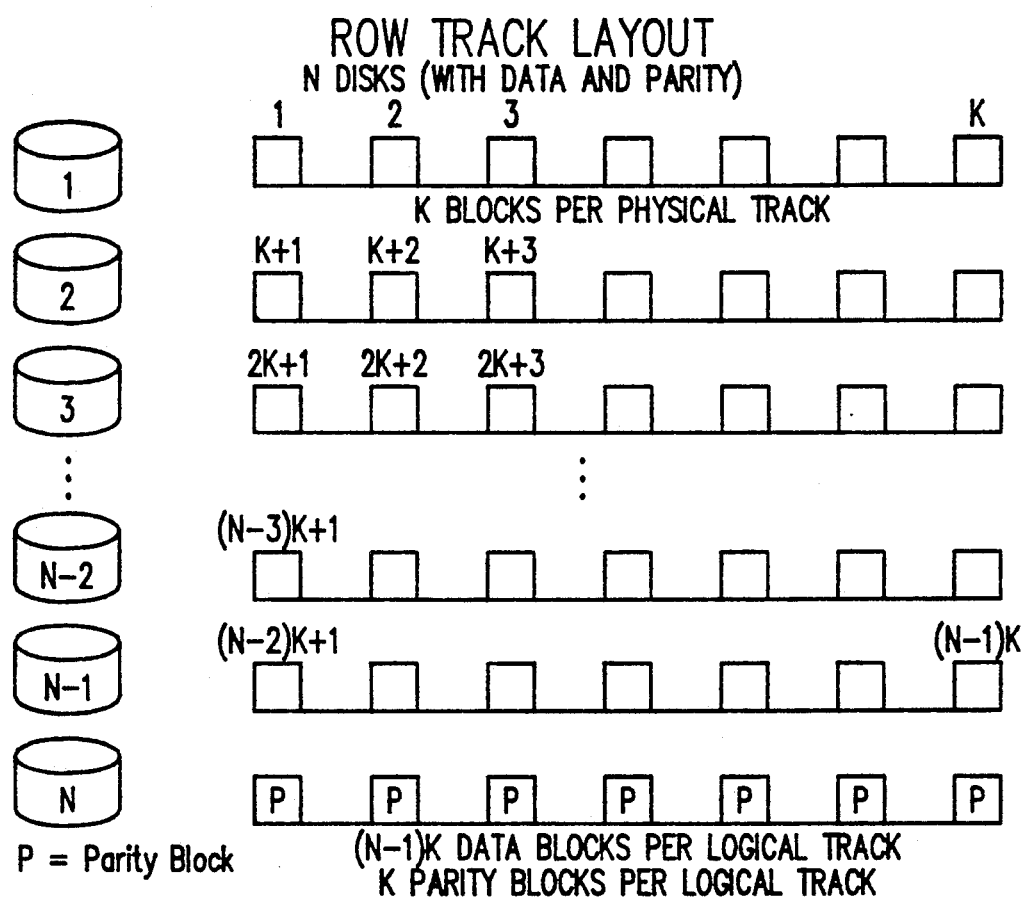

Referring now to FIG. 3, there is depicted another type of track layout for a RAID 5 DASD array. As before, the array has N DASDs, K blocks per physical track, and NK blocks per logical track. However, unlike column track layout, consecutive blocks of the logical track are stored along a physical track (row order), as opposed to along the columns. For the logical track shown in FIG. 3, (say Logical Track 1), all the parity is stored on the physical track of DASD N. Then, for Logical Track 2 (not shown in the figure), we would choose to store all the parity in DASD N-1, for Logical Track 3, all the parity would be stored in DASD N-2, and so on. Thus, as for column track layout, the parity is spread among all the DASDs, and there is no one single parity DASD.

One of the major drawbacks of the RAID 5 array is that four accesses are required to update a single block. For example, in FIG. 3, updating Block 1 requires reading old values from Blocks 1 and N, calculating new parity by XORing old data, old parity and new data, then writing new data to Block 1 and new parity to Block N. The number of DASD accesses required to complete an update can potentially affect the performance of RAID 5 arrays significantly.

How The Invention Avoids The RAID 5 Limitations

Figure 4:
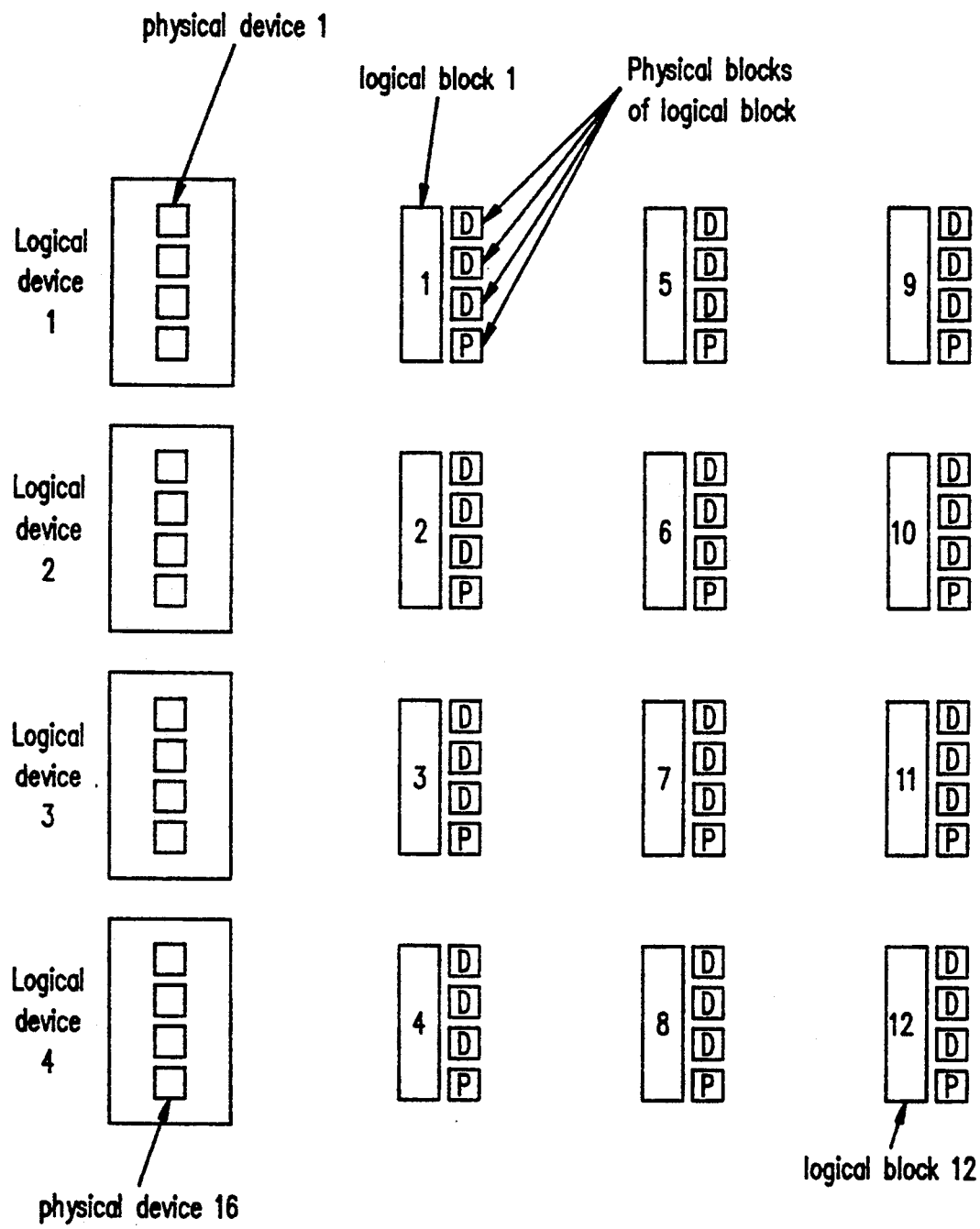
FIG. 4 sets forth a RAID 5 array of RAID 3 DASD arrays according to the invention.

Referring now to FIG. 4, there is shown a RAID 3 DASD array as the basic building block. For example, 4×2.5" form factor DASDs are preferable physically packaged together to appear as a single logical device organized as a 3+P RAID 3 array. This logical device can also be packaged as a separate drawer (though this is not necessary) which would then be a fault-tolerant drawer. A write to such a logical device would cause the written block to be striped and written across 3 different DASD, and parity to be generated and simultaneously written to the fourth DASD which is the parity DASD. A single logical block is written as three physical blocks on three different DASD, so the logical block size is equal to 3 times the physical block size.

Referring again to FIG. 4, there is set out a RAID 5 array organization of RAID 3 DASD arrays. In FIG. 4, there is shown an array hierarchy consisting of 4 logical devices organized as a RAID 5 array with an interleave depth of 1. In this configuration, reading or writing a single block only involves one logical device in the array. Unlike a RAID 5 DASD array, a single block write does not require reading old data, reading old parity, or writing new parity. It only involves writing new data to the one logical device involved in the update operation.

A RAID 5 array of RAID 3 DASD arrays has attributes of both RAID 3 and RAID 5 arrays. In a manner similar to a RAID 5 array, the array hierarchy exhibits high performance on small requests and high data rate on large requests. In a manner similar to a RAID 3 array, the array hierarchy does not require four operations for write updates. Furthermore, its performance in degraded mode is the same as its performance in normal mode.

Normal Mode Accessing for a RAID 5 Array of RAID 3 DASD Arrays

Consider a RAID 5 array of RAID 3 array with the following parameters:
N=number of DASDs in array
I=interleave depth The following steps describes the method used to access logical block X in the RAID 5 array of RAID 3 array.
(1) Calculate B as X/(I*N)
(2) Calculate R as 1+modulo (X-1)/(I*N)"
(3) Calculate device D as ceil(R/I)
(4) Calculate logical block within device LBD as 1+modulo (R-1)/I"+B*I
(5) Access logical block LBD in logical device D. For a write, this involves writing the data to three physical blocks and the parity to a fourth physical block. For a read this involves reading three physical blocks.

Referring again to FIG. 4, in this array, I=1 and N=4. Consider a request to access logical block 6 (i.e. X=6). Then, B=6/4=1. R=2. Logical device D=2.

Logical Block within Device LBD=2. So, logical block 6 is really the second logical block on logical device 2.

A large access to a RAID 5 array of RAID 3 array, say to read L blocks starting at logical block X would work as follows. Use the steps described above to calculate device D and logical block within device LBD for each of the L blocks in the access. Access the L blocks as calculated.

Degraded Mode Access Steps for RAID 5 array of RAID 3 Arrays

The method for making a small access to the array hierarchy is described. From this, the method for large access is then immediately apparent.
(1) Calculate device D and logical block within device LBD as during normal mode.
(2) Execute a read of a logical block by:
  (a) If the three physical data devices on the designated logical device D are all available, read three physical blocks from the three devices and return logical block.
  (b) If one of the physical devices in logical device D is broken, and it happens to be one of the three data devices, then read the two available physical data blocks and the available parity block. Use the parity block to calculate the value of the missing data block, thus creating the entire logical data block.

(3) Execute a write of a logical block by:
(a) If all four physical devices in D are available, then proceed as in normal mode; that is, split the logical block into thirds, write each third to a different physical device and the XOR of the thirds into the parity block.
(b) If the parity physical device is broken, then split the logical block into thirds and write each third to a different physical device.
(c) If one of the three data physical devices is broken, split the logical block into thirds, write two of these three to the two available devices, then write the XOR of the three thirds to the parity device.

Sparing and Rebuild in RAID 5 Array of RAID 3 Arrays

A spare logical device is used to facilitate rebuild in RAID 5 array of RAID 3 arrays. When a physical device in a logical device is broken, data from the broken logical device is copied to the spare logical device. This repair procedure is simpler than that for RAID 3 or RAID 5 arrays, since data can still be read or written to a broken logical device. In RAID 3 and RAID 5 arrays, the rebuild procedure consists of reading all the other devices in the array, XORing corresponding blocks, then writing the resultant XORs to the spare device. Therefore, in RAID 3 and RAID 5 arrays, the rebuild procedure requires extra work of all the devices in the array. In a RAID 5 array of RAID 3 array, the rebuild procedure only involves the broken device and the spare device; all other devices are unaffected.

Referring again to FIG. 4 and assuming that one of the DASDs in logical device 2 has just failed, then the recovery algorithmically involves:

```
Let N: = the number of logical devices from 1, 2, 3, . . . N
T: = the number of tracks per DASD
DO i: = 1 to N
READ track i from logical device 2;
WRITE track i to spare logical device;
END DO
CHANGE path connection tables such that all references to
logical device 2 are applied to the spare logical device;
ISOLATE old logical device 2 and replace failed DASD.
```

CKD RAID 5 Array of RAID 3 Arrays

Up to this point, the accessed data structures for the RAID 5 array of RAID 3 arrays have been blocks formatted on DASDs in fixed-block extents only. However, one extension of this invention involves modification of the RAID 5 array of RAID 3 arrays in which the DASDs are formatted in variable length extent according to the well known Count-Key-Data (CKD) convention.

Figure 7:
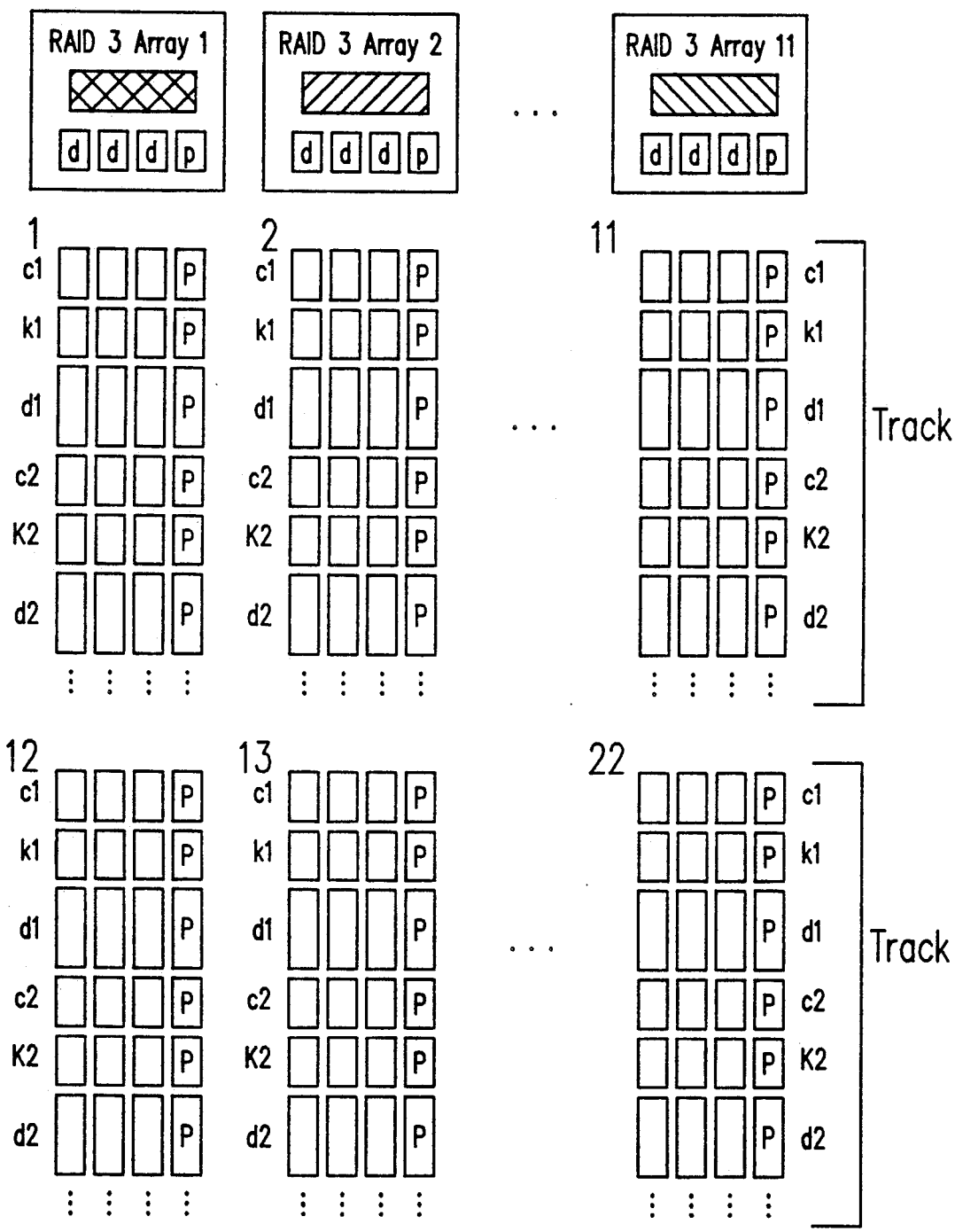
FIG. 7 illustrates the addressing pattern of the RAID 5 array of RAID 3 devices for variable length (CKD) formatted logical records.

Referring now to FIG. 7, there is shown a CKD RAID 5 array of RAID 3 arrays with an interleave depth of one track. It comprises a row at the top of the figure of RAID 3 CKD arrays (logical devices) 1 through 11. Logical tracks are shown as groups of rows underneath the counterpart logical device.

The CKD track on each RAID 3 logical device is laid out as follows:

(a) every count field is replicated on the 3 physical data devices of the logical device;
(b) every key and data field is split three ways, with each third being stored on one of the three physical data devices;
(c) the parity track has the same number of fields as the corresponding three data tracks, each field being the XOR of the corresponding three fields from the three data tracks.

Referring again to FIG. 7, CKD track 1 is stored on DASD 1, CKD track 2 on DASD 2, . . . , CKD track 11 on DASD 11, CKD track 12 on DASD 1, and so on. Thus, the interleave depth is 1 track. With this layout, a request to read 12 or more tracks together, would be processed at the maximum data rate. It should be readily obvious to the careful reader that interleave depths of multiples of a track can also be easily accommodated. So, CKD tracks 1 and 2 can both be on DASD 1, CKD tracks 3 and 4 can both be on DASD 2, and so on.

The CKD RAID 5 array of RAID 3 arrays as depicted in FIG. 7 preserves all of the advantages previously outlined for the general case. These are namely-simplicity, no reads before writes, high availability, high throughput on small requests, high bandwidth on small requests.

In another embodiment the CKD RAID 5 array of RAID 3 arrays can be interleaved in units smaller than a track; such as a ¼ track. That is ¼ of a CKD track is on DASD 1, next ¼ on DASD 2, and so on. This is subject to the restriction that records may now span logical device boundaries. This limitation would not occur upon interleave depths being limited to being multiples of full tracks.

As may be recalled, each DASD track extent is divided into a number of equal length sectors for addressing and rotary positioning sensing purposes. As described in Luiz et al, U.S. Pat. No. 4,207,609, "Method and Means for Path Independent Device Reservation and Reconnection in a Multi-CPU and Shared Device Access System", issued Jun. 10, 1980, a CPU may use a virtual or real process for accessing an external storage subsystem termed a "channel" or "channel program" independent of other CPU activities. The channel access involves data locations ultimately mapped into a specific DASD, cylinder, track, track sector and head address of the external storage subsystem (DASD array).

The storage model used in this invention maps logical tracks onto a RAID 5 array of logical devices in a pattern as prescribed above. A second mapping is made to the RAID 3 level DASDs. Adjustments in the mapping include a sector number offset in a channel program. Such an offset can be easily converted to a particular logical device number, where a given CKD record resides.

As an example of the use of sector number offset, consider the fact that offsets less than ¼ of a rotation would map to logical device 1, offsets between a ¼ and ½ a rotation would map to logical device 2, and so on. Reading of a record would presumptively start from that logical device. If the record continues or spans the next logical device, then reading would continue from the next logical device, and so on. This is managed in a manner similar to the processing of overflow CKD records in prior DASD storage subsystems.

Extensions

There are five extensions embodying the principles of this invention. The first and second extensions are discussed with respect to FIGS. 5 and 6 and treat array hierarchies of dissimilar interleave depths and partitioned storage thereon. The third and fourth extensions incorporate FIGS. 8 and 9 and treat logical devices distributed among physical devices clustered within the same power boundary and the rebuild of a failed DASD onto a spare. The last extension is a summary description of an array hierarchy of a RAID 5 array of RAID 5 DASD arrays.

Figure 5:
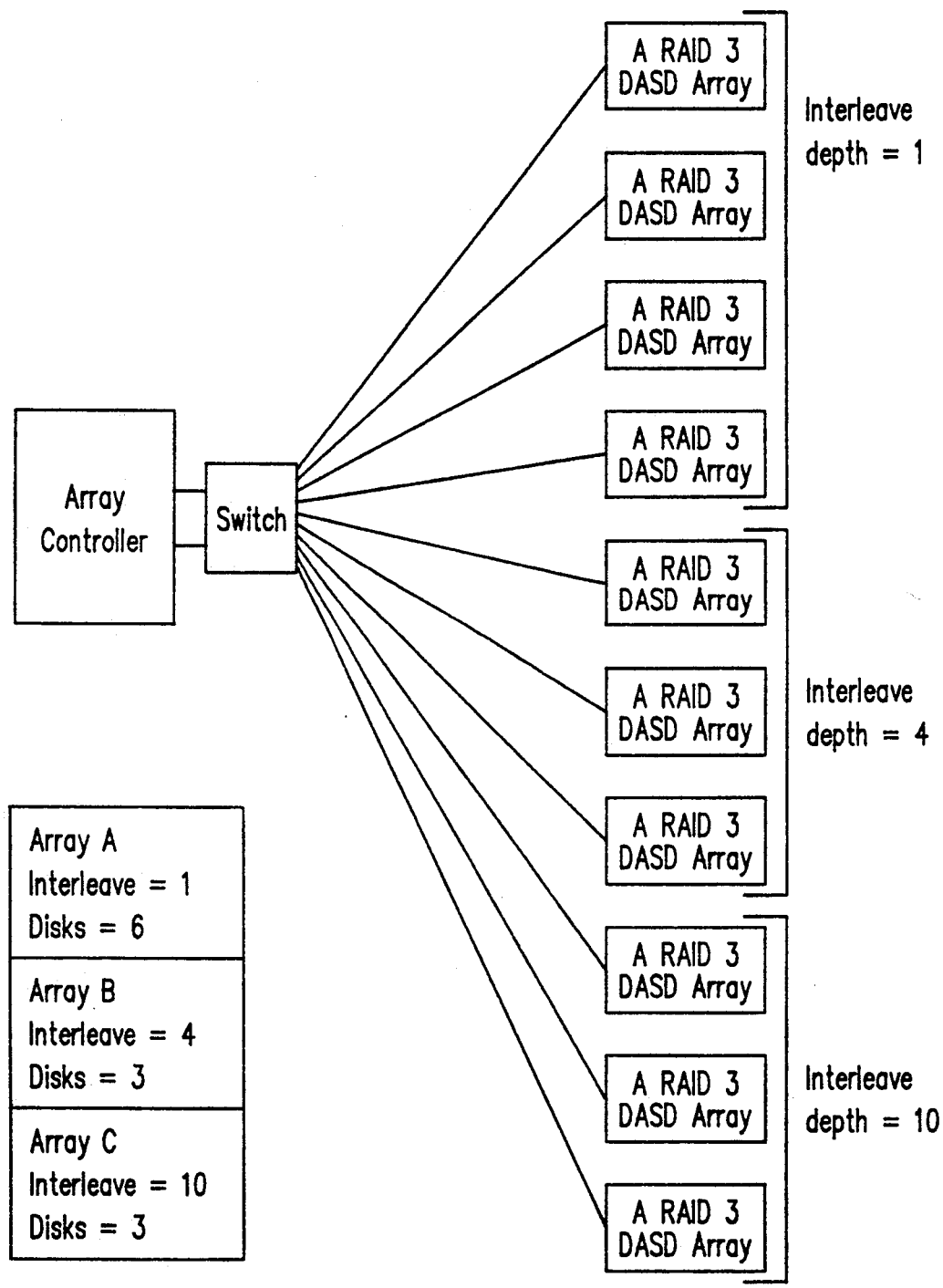
FIG. 5 articulates an attachment of RAID 5 of RAID 3 DASD arrays with dissimilar interleave depth of the blocks of logical records written thereon.
Figure 6:
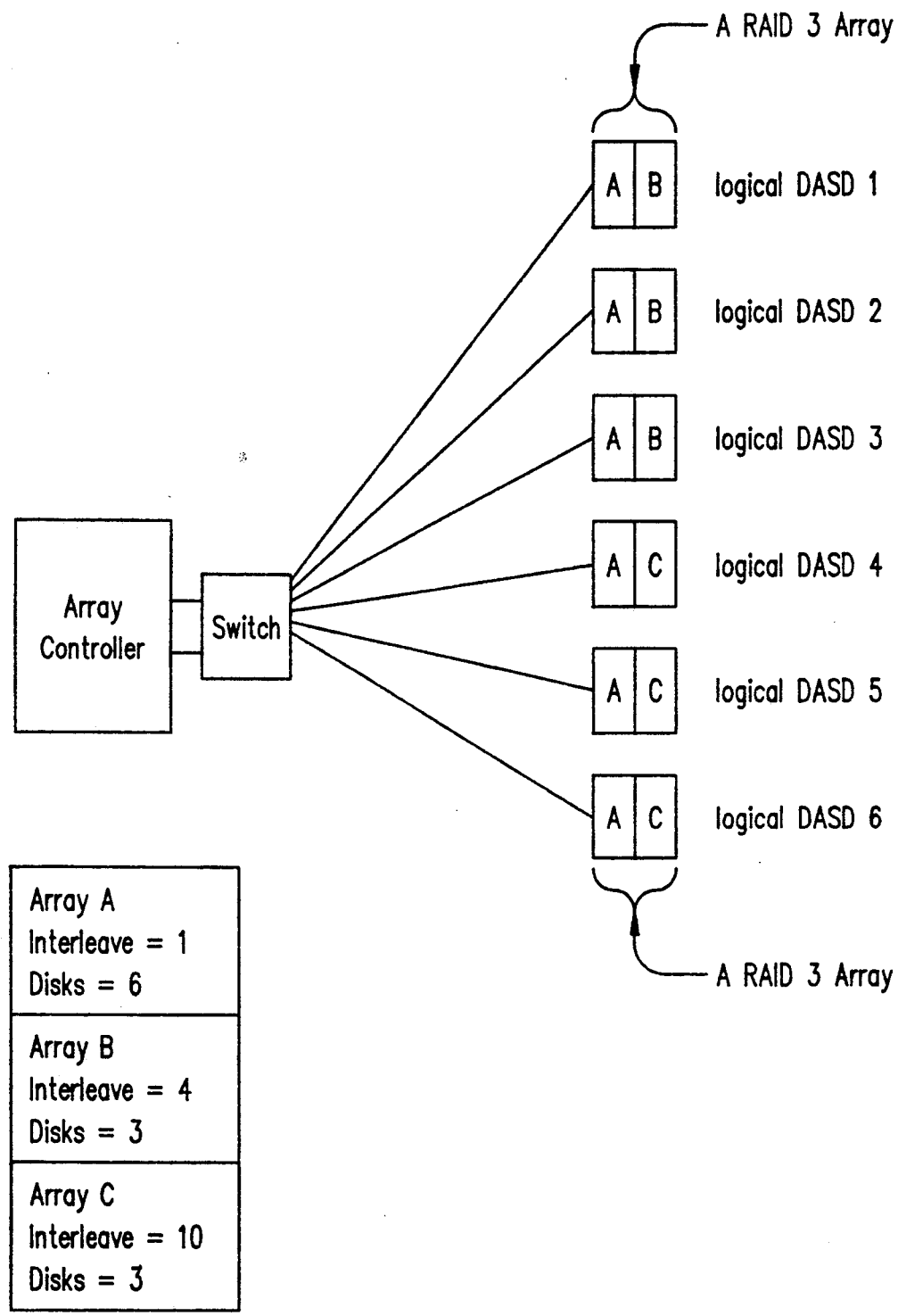
FIG. 6 shows a further extension of FIG. 5 forming a RAID 5 of RAID 3 DASD arrays in the form of multiple fractional arrays.

Referring now to FIG. 5, there is shown a subsystem with 10 logical devices or RAID 3 DASD arrays organized as three RAID 5 of RAID 3 arrays (A, B, C). Array A includes four logical devices and an interleave depth of 1. Array B has logical devices with an interleave depth of 4. Lastly, array C attaches three logical devices and has an interleave depth of 10. Users of the storage subsystem would first define and create the different RAID 5 array of RAID 3 arrays. At array creation time, the users would specify the number of logical devices to be included in the array and the interleave depth and they would also specify a name for the array.

After creation of the dissimilar RAID 5 of RAID 3 array's, the controller accepts requests to read/write logical blocks within the created array. For each created RAID 5 of RAID 3 array, the array controller would need to save away in a table the actual logical devices involved in the RAID 5 array of RAID 3 arrays, the name of the array, and the interleave depth of the array. Such a table must be maintained in stable, non-volatile storage.

Referring again to FIG. 6, there is set forth an embodiment in which RAID 5 of RAID 3 arrays do not consist of exactly some number of DASDs. That is, each RAID 3 array consists of fractions of DASDs. As an example, in FIG. 6, there is displayed a subsystem having with 6 logical devices. These are configured as follows:

(1) Array A is constructed from ½ of logical devices 1 through 6,
(2) Array B from half of logical devices 1 through 3, and
(3) Array C from ½ of devices 4 through 6.

As before, each of the RAID 5 of RAID 3 arrays may have a different interleave depth. At array creation time, the user specifies the array name, the interleave depth, the number of devices in the array and the number of logical blocks in the array. The last two parameters together determine the fraction of each DASD device that will be included in the DASD array.

Referring now to FIG. 8, there is shown an array controller 801 communicatively attaching a four drawer (four clusters) DASD array. The array includes logical devices (e.g. device A) formed from DASDs located in different physical DASD clusters e.g. 807, 817, 831, and 841. The communicative coupling occurs over a path including parity and striping logic 803, switch 805, and control and data links. The latter are shown as dotted line connections between switch 805 and each DASD in each of the physical clusters or drawers.

Referring again to FIG. 8, logical device A comprises data DASDs 809, 819, 833 and parity DASD 843. Likewise, logical device B includes data DASDs 811, 813, 821, and parity DASD 823. Furthermore, logical device C has the data DASDs 815, 825, 839 and parity DASD 849 while logical device D embraces data DASDs 835, 837, 845 and parity DASD 847.

It should be noted that the DASDs of logical devices A and C are distributed to counterpart physical DASD clusters 807, 817, 831, and 841. However, the DASDs of logical device B are distributed only to clusters 807 and 817 and those of logical device D form part only of clusters 831 and 841.

As should be appreciated for array purposes, DASDs are physically grouped or clustered together in a mechanical and electrical packaging unit termed a "drawer". Each drawer has its own power and would include various electrical and mechanical plug connections which facilitate removal and replacement of DASDs individually. A drawer defines a power distribution as well as a packaging and servicing boundary.

When a logical block is to be written to say logical device A, logic 803 segments the block and switch 805 establishes a path such that the first third is recorded on DASD 809 in cluster 807, the second third on DASD 819 in cluster 817, and the last third on DASD 833 in cluster 831. Parity over the segmented thirds is written to DASD 843 in cluster 841. Similarly, the segmenting and taking parity occurs when writing logical blocks to logical devices B, C, and D.

With respect to sparing and rebuild activities, a single spare logical device provides redundancy across multiple arrays. The failure of a physical device requires that logical blocks be copied from the broken logical device to the spare logical device.

Referring now to FIG. 9, there is shown an array controller and DASD array hierachy configuration similar to that depicted in FIG. 8 with the addition of a logical device reserved as a spare. The spare device is distributed as a spare DASD 917, 927, 939, and 951 in respective clusters 907, 919, 929, and 941.

Suppose DASD 909 of logical device A and residing in cluster 907 fails. The sparing and rebuild algorithm is simply that of (a) reading from the remaining DASDs 921, 931, and 943 over paths including switch 905,
(b) logically combining the three segments of each block to reconstitute the fourth segment logic 903,
(c) writing the four segments to counterpart DASDs 917, 927, 939, and 951 of the spare device,
(d) substituting the address of the spare for that of device A in the pathing or address tables,
(e) changing DASDs 921, 931, and 943 formerly of device A to serve as part of the new spare device, and
(f) replacing failed DASD 909 opportunistically with another DASD to complete the augmentation of the spare device, thereby returning the array hierarchy to normal operating mode.

For completeness in FIG. 9, device B is formed from DASDs 911, 913, 923, and 925; device C includes DASDs 915, 926, 937, and 949; and device D comprises 933, 935, 945, and 947 variously distributed among the clusters.

The last extension relates to the formation of an array hierarchy in which each logical device is a RAID 5 DASD array. A RAID 5 array of RAID 5 DASD arrays exploits the indirection inherent in the invention hierarchy by striping over RAID 5 arrays, the total data rate is not limited to that obtainable from any one array.

Resume'

The RAID 5 array of RAID 3 DASD arrays uses a RAID 3 array as a building block and stripes across the RAID 3 arrays. Similar to a RAID 5 array, the array hierarchy of this invention achieves high throughput on small requests and high bandwidth on large requests. Unlike RAID 5 arrays, in this invention, write updates do not require DASD accesses to read old data and old parity nor does it require DASD accesses to write new parity. Therefore, it does not have the four write penalty associated with RAID 5 arrays.

Additionally, the RAID 5 array of RAID 3 array is much simpler than a RAID 5 array to operate. For example, it does not have the problem of having to lock parity groups, as required by RAID 5, in order to maintain the consistency of parity groups in the face of concurrent updates. During degraded mode, when a physical device in the array is broken, the RAID 5 array of RAID 3 array suffers no loss in performance; it behaves like a RAID 3 array in this regard.

Finally, rebuild in the array hierarchy of this invention is simpler than rebuilding either in RAID 3 or RAID 5 arrays, since it uses only the broken and spare devices and involves only a copy between them. In the prior art RAID 3 or RAID 5 arrays, rebuild involves ALL the other devices in the array and is more complex than copy. An additional benefit of a RAID 5 array of RAID 3 array is that devices need not be hot-pluggable. After data from the broken logical device is copied to a spare device, the physical devices in the broken logical device may all be powered off and repaired off-line.

These and other extensions of the invention may be made without departing from the spirit and scope thereof as recited in the appended claims.

We claim:

1. A method for accessing data strings from a plurality of DASDs, comprising the steps of:
   (a) configuring the plurality of DASDs into a RAID 5 array of logical devices, each logical device including N data+P parity DASDs in RAID 3 DASD array;
   (b) segmenting each data string into K logical records of N data blocks each, coding P parity blocks over each segmented record, and accessing said K logical records in column major order of predetermined interleave depth onto the RAID 5 array logical devices; and
   (c) transferring K records at N data+P parity blocks at a time according to the order and depth from the RAID 3 DASD arrays.

2. A method for writing data strings applied to a storage subsystem, said subsystem being formed from a plurality of RAID 3 DASD arrays, each RAID 3 array having N data+P parity DASDs attaching a controller, comprising the steps of:
   (a) configuring the plurality of RAID 3 DASD arrays into a RAID 5 array of addressable logical devices by communicatively attaching each of their controllers through a common control unit; and
   (b) segmenting each data string at the common control unit into K logical records of N blocks each, parity coding each logical record and adding P blocks thereto, and
   (c) writing K logical records of N data+P parity blocks, each in column major order of predetermined interleave depth, onto the RAID 5 array of logical devices such that the N data+P parity blocks of each logical record are recorded onto N data+P parity DASDs of a counterpart RAID 3 array operating as the addressed logical device through a path including its controller.

3. A method for managing large and small accesses of portions of data strings formed from K* (N data+P parity) blocks applied to a storage subsystem formed from a plurality of RAID 3 DASD arrays, each RAID 3 array having N data+P parity DASDs attaching a controller, comprising the steps of:
   (a) configuring the plurality of RAID 3 DASD arrays into at least one level of indirection forming a RAID 5 array of logical devices of RAID 3 DASD arrays, and, reserving at least one of the logical devices as a spare device by communicatively attaching each controller to a common control unit;
   (b) accessing the logical devices, other than the spare device, through a path including the common control unit in column major order of predetermined interleaved depth;
   (c) detecting a DASD failure in a RAID 3 array;
   (d) responsive to detection of said failure, accessing the logical devices as in step (b) but for the failed DASD; and
   (e) rebuilding and rewriting N data+P parity DASDs of the logical device whose counterpart RAID 3 array contains the failed DASD onto a spare device on either a predetermined or opportunistic schedule, said rebuild and rewrite spanning only the spare device and said device having the failed DASD.

4. The method according to claim 3, wherein the accessing step further comprises:
   (b1) accessing K* (N+P) blocks from the RAID 5 array in row major order K modulo M and in column major order K modulo M* (N+P), M lying in the closed integer interval (1,K), the partial sum N+P designating N data blocks+P parity blocks; and
   (b2) executing large and small access requests over the RAID 5 array such that a minimum number X of blocks transferred to achieve the maximum data rate for a given M lies in the closed interval ((N+P−1, (N+P−1) *K) whose end points are defined by M=1 and M=K respectively.

5. The method according to claim 3, wherein the step of accessing all but the failed DASD in the RAID 3 array of an accessed logical device responsive to a small read access further includes:
   reading all but the failed DASD and reconstructing any unavailable data block by logically combining the N+P−1 available blocks, the partial sum N+P designating N data blocks+P parity blocks; and
   writing to all but the failed DASD such that the parity block and all but one of the data blocks are stored on the remaining DASDs of RAID 3 array of the accessed device.

6. A storage subsystem comprising:
   a plurality of RAID 3 arrays of DASDs, each RAID 3 array including N data+P parity DASDs attaching a local controller;
   a control unit communicatively attaching a subset of the plurality of RAID 3 arrays of DASDs to form an addressable RAID 5 array of logic device equivalents of the RAID 3 arrays through a path including the control unit and local controllers; and means including the control unit and responsive to each data string formed from K*N blocks for segmenting the string into N blocks, encoding P parity blocks over each segment, and writing K of the N data+P parity block segments in column major order of predetermined interleave depth on to counterpart logical devices.

7. The storage subsystem according to claim 6, wherein said segmenting, encoding, and writing means further includes means for recording the N data+P parity blocks of each logical device onto N data+P parity DASDs of a counterpart RAID 3 array through a path including its controller.

8. A storage subsystem comprising:
a plurality of logical devices, each logic device including a RAID 3 array of DASDs having N data+P parity DASDs attaching a local controller;
a control unit communicatively attaching a subset of the plurality of logical devices to form an addressable RAID 5 array of said logical devices through a path including said control unit and local controllers, others of the plurality of logical devices being reserved as spare logical devices;
first means including the control unit responsive to each data string formed from K*N blocks for segmenting the string into N blocks, encoding P parity blocks over each segment, writing K of the N data+P parity block segments in column major order of a predetermined interleave depth on to counterpart logical devices, and for recording the N data+P parity blocks of each segment onto N data+P parity DASDs of a counterpart RAID 3 DASD array to the device through a path including its controller;
second means including the control unit for detecting a DASD failure in the RAID 3 DASD array counterpart of a logical device and for writing to the logical devices in a predetermined designated order and depth and recording the blocks but for those blocks destined for the failed DASD; and
third means for rebuilding and rewriting N data+P parity DASDs of the logical device whose counterpart RAID 3 array contains the failed DASD onto the spare logical device on either a predetermined or opportunistic schedule, said rebuild and rewrite spanning only the spare logical device and said logical device having the failed DASD.

9. The storage subsystem according to claim 8, wherein
said plurality of logical devices further comprising a first RAID 5 array of m logical devices and a second RAID 5 array of n logical devices, m not equal to n;
said control unit further comprises means for switchably coupling the control unit to any one of the RAID 5 arrays; and
said first means including the switching means further comprises means for selecting any of the RAID 5 arrays and recording segments on the logical devices thereof in column major order thereon to an interleave depth distinguishable from the interleave depth of at least one other RAID 5 array.

10. A storage subsystem comprising:
a plurality of logical devices, each device formed from a RAID 3 array of DASDs;
a control unit for communicatively attaching either a first or a second RAID 5 array of the logical devices;
first means including the control unit for selecting the first RAID 5 array, segmenting a data string into segments of m data blocks, coding p parity blocks over each segment, and writing each segment of m data+p parity blocks across the logical devices of the first RAID 5 array in column major order to a first interleave depth; and
second means including the control unit for selecting a second RAID 5 array, segmenting another data string into n data blocks, coding p parity blocks over each segment, and writing each segment of n data+p parity blocks across the second DASD subset in column major order to a second interleave depth, at least one of the devices of the second RAID 5 array being also a member of the first RAID 5 array.

11. The storage subsystem according to claim 10, wherein at least one logical device DASD of the plurality of logical devices reserving a fraction of its storage capacity to the first and the second RAID 5 arrays proportional to the number of logical devices in each RAID 5 array.

12. The storage subsystem according to claim 10, wherein n not being equal to m, and the second depth not being equal to the first depth.

13. A method for writing variable length, count-key-data (CKD) field formatted records to a storage subsystem, said subsystem being formed from a plurality of RAID 3 DASD arrays, each RAID 3 array having N data+P parity DASDs attaching a controller, comprising the steps of:
(a) configuring the plurality of RAID 3 DASD arrays into a RAID 5 array of addressable logical devices by communicatively attaching each of their controllers through a common control unit; and
(b) segmenting each data string at the common control unit into K logical records of N stripes each, parity coding each logical record and adding P strings thereto, and
(c) writing K logical records of N data+P parity strings, each in row major order of predetermined interleave depth, onto the RAID 5 array of logical devices such that the N data+P parity strings of each logical record are recorded onto N data+P parity DASDs of a counterpart RAID 3 array operating as an addressed logical device through a path including its controller such that:
(1) each count field of a CKD formatted variable length record being replicated on the N DASDs of the first device in row major order,
(2) the key and data fields following the count field of a CKD formatted variable length record being segmented and recorded across N DASDs of the counterpart RAID 3 array operating as the addressed logical device in the predetermined row major order and interleave depth, and
(3) each parity block P logically combining a counterpart N fields.

* * * * *